July 1, 1930.                    P. E. GILLING                    1,769,130
                              ELECTRICAL CONDENSER
                              Filed May 10, 1929
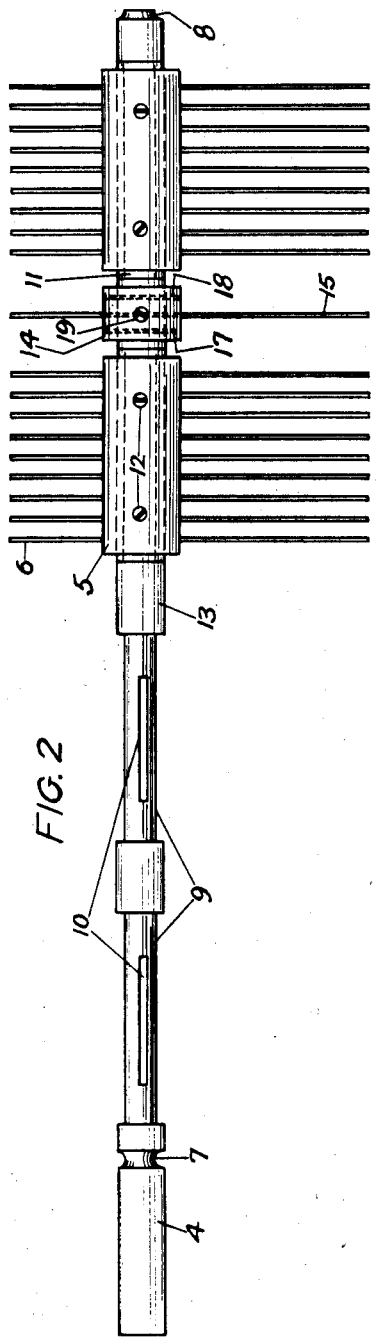
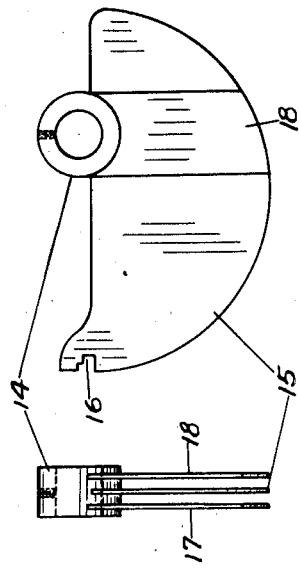
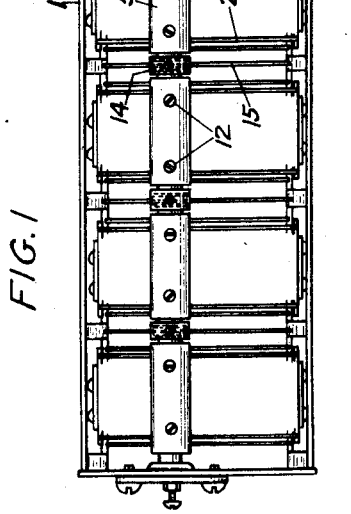
INVENTOR
PRESTON E. GILLING
BY
A. D. T. Libby
ATTORNEY Patented July 1, 1930

1,769,130

UNITED STATES PATENT OFFICE

PRESTON E. GILLING, OF HADDON HEIGHTS, NEW JERSEY, ASSIGNOR TO RADIO CONDENSER COMPANY, OF CAMDEN, NEW JERSEY

ELECTRICAL CONDENSER

Application filed May 10, 1929. Serial No. 361,948.

This invention relates to improvements in electrical condensers which are used in radio receiving sets.

In such instruments it has become quite common practice to use what is known as a single dial control wherein, in many cases, the condensers are arranged in a gang on a framework and have a common shaft supported by this frame. In such an arrangement, which is a tandem one, the groups of stator plates are mounted on the frame, and the groups of rotor plates are carried on the common shaft. Either the stator or rotor groups of plates may be insulated from the frame, and in the arrangement herein described, the rotor groups are insulated from the shaft in a manner similar to that shown in Cramer et al. application, S. N. 354,468, filed April 12, 1929.

Where condensers are so arranged, it is advantageous that some shielding means be used between the groups of rotor plates so as to prevent or reduce the electro-static inter-coupling effect between individual condensers. Furthermore, it is essential that some means be provided for establishing a balance between the individual condensers, so that they all will have at least an equal fixed minimum capacity whereby they may be adjusted in their respective circuits to the best advantage.

It is the object of my invention to provide an arrangement by which this shielding and balancing or compensating feature may be obtained in a simple and inexpensive manner.

My improvements will be best understood by reference to the attached drawing, in which Figure 1 is a plan view on a reduced scale, showing a four-gang condenser; that is, a common frame having four individual condensers mounted thereon. It also shows my improved shield and compensator arranged between the individual unit condensers.

Figure 2 is a full-size view of the rotor shaft showing two groups of rotor plates mounted thereon, with one of the unit shielding compensating devices between the two groups of rotor plates.

Figure 3 is a plan view of the unitary device comprising the shield and compensators shown in Figure 2.

Figure 4 is an end view of Figure 3.

In the drawing, wherein like numbers refer to corresponding parts in the various views, 1 illustrates a framework carrying groups of stator plates 2, only the outside plates of the stator groups being shown. These groups of stator plates are held together by tie bars 3, and these tie bars are anchored to the frame 1. A single common shaft 4 carries a plurality of sleeves 5 to which are fastened groups of rotor plates 6.

As shown in Figure 2, the rotor shaft 4 is adapted to be carried in the frame 1 through the medium of ball races 7 and 8, all as explained in Cramer application, S. N. 332,700, filed January 15, 1929. Also as shown, the shaft 4 is provided with a plurality of cutaway portions 9, one for each set of rotor plates, and each of these cut-away portions is preferably provided with a keyway 10 for the purpose of anchoring insulating material 11 which is preferably moulded on the shaft in the reduced portions 9. As shown in Figure 2, the rotor sleeves 5 are adapted to slide on the shaft over these insulating portions to which they are anchored in any satisfactory manner as by screws 12.

Separating the reduced portions 9, are parts 13 of the full diameter of the shaft, and these parts 13 are adapted to receive a hub 14 to which is securely attached in any satisfactory manner, a shield plate 15 which may be a plate exactly the same as one of the rotor plates 6, and which is preferably notched at 16 to receive a tie bar which is not shown in Figure 2 in the rotor assembly.

Carried by the hub 14 on opposite sides of the shield plate 15, is a pair of adjustable compensating plates 17 and 18. The plates 17 and 18 preferably extend radially from the hub 14 in a general direction parallel to the shield 15, to a point conforming to the peripheral contour of the shield 15, as shown in Figure 3. The hub 14 is anchored to the part 13 in any satisfactory manner as by a screw 19. Preferably, the hub 14 has some adjustment longitudinal on the part 13 and likewise, it may be turned arcuately on the part 13 to the desired position, but as shown in Figure 2, it is positioned in the same manner as the rotor plates 6.

By turning the shaft 4 so that the rotor plates are out of operating engagement with the stator groups of plates, the compensating plates 17 and 18 may be adjusted by bending so as to balance the adjacent condensers nearest to these compensating plates, and after being once set, the compensating plates are operated with the shield as the shaft 4 is turned.

While I have chosen to illustrate my invention in connection with a gang condenser in which the stator plates are grounded on a frame and in which the rotor plates are insulated from the shaft, it is apparent that it may be used in connection with a reverse combination, or an arrangement wherein both stators and rotors are insulated.

Having thus described my invention, what I claim is:

1. A gang condenser comprising a plurality of separate condensers having their stators mounted on a common frame and having their rotors spaced on a single shaft supported by the frame, said rotors being insulated from the shaft and from each other; a hub electrically and mechanically connected to the shaft between adjacent rotor units, a shield plate fastened to each hub to rotate with the rotor units, and a pair of capacity compensating plates carried by the hub, one on each side of the shield plate for cooperation with the condenser nearest it.

2. In a gang condenser comprising a plurality of separate condensers having their stators mounted on a common frame and having their rotors spaced on a single shaft supported by the frame, said rotors being insulated from the shaft and from each other; a shield plate electrically connected to and carried by the shaft between adjacent rotor units to rotate therewith, and a pair of capacity compensating plates carried by the shaft, one each on opposite sides of the shield plate for the purpose described.

3. In a gang condenser comprising a plurality of separate condensers having their stators mounted on a common frame and having a single shaft supported by the frame, said shaft having reduced portions separated by full diameter parts and the reduced portions covered by insulation, groups of rotor plates assembled on a group sleeve to fit over its designated insulated shaft portions, a hub for each full diameter part adapted to be slid over the shaft end, and insulated portions to its designated full diameter part between adjacent rotor groups of plates and secured thereto, a shield plate fastened to each hub to rotate with the rotor units, and a pair of capacity compensating plates carried by the hub, one on each side of the shield plate for cooperation with the condenser nearest it.

4. In a gang condenser comprising a plurality of separate condensers having their stators mounted on a common frame and having a single shaft supported by the frame, said shaft having portions covered by insulating material anchored to the shaft, said portions of insulating material being separated by metallic parts of the shaft, groups of rotor plates assembled on respective group sleeves which are adapted to fit over its designated insulated shaft portion, a hub for each of said metallic parts of the shaft located between said insulating material portions, a shield plate fastened to each hub to rotate with the rotor units, and a pair of capacity compensating plates carried by the hub, one on each side of the shield plate for cooperation with the condenser nearest it.

5. For a gang condenser consisting of; a plurality of stator and rotor units arranged in tandum on a frame, the rotor units being on a common shaft; a unitary device rotatably carried on the shaft between adjacent rotor units, said device comprising a hub having a shield plate attached thereto, and a pair of compensating plates carried on the hub on opposite sides of said plate.

6. For a gang condenser consisting of; a plurality of stator and rotor units arranged in tandem on a frame, the rotor units being on a common shaft; a unitary device rotatably carried on the shaft between adjacent rotor units, said device comprising a shield plate of substantially the same shape and area as the rotor plates with means for supporting the shield on the rotor shaft, and a pair of compensating plates carried on said support means on opposite sides of said shield and extending and conforming to the peripheral contour of said shield.

7. For a gang condenser consisting of; a plurality of stator and rotor units arranged in tandem on a frame, the rotor units being on a common shaft; a unitary device rotatably carried on the shaft between adjacent rotor units, said device comprising a shield plate with means for entirely supporting the plate on the rotor shaft, and a pair of adjustable compensating plates carried on said shield plate support means on opposite sides of said shield.

In testimony whereof, I affix my signature.

PRESTON E. GILLING.